United States Patent [19]
DePaul

[11] Patent Number: 4,783,699
[45] Date of Patent: Nov. 8, 1988

[54] APPARATUS AND METHOD FOR TRANSMITTING INFORMATION BY MODULATED VIDEO SIGNAL

[76] Inventor: Albert D. DePaul, 407 W. 40th St., New York, N.Y. 10018

[21] Appl. No.: 912,104

[22] Filed: Sep. 29, 1986

Related U.S. Application Data

[63] Continuation-in-part of Ser. No. 760,874, Jul. 31, 1985, abandoned.

[51] Int. Cl.⁴ .................... H04N 7/08; H04N 7/093
[52] U.S. Cl. ............................. 358/142; 358/145; 358/147
[58] Field of Search ........................... 358/141–147; 380/10–20

[56] References Cited

U.S. PATENT DOCUMENTS 4,396,946  8/1983  Bond ................................. 380/20

Primary Examiner—James J. Groody
Assistant Examiner—Michael D. Parker
Attorney, Agent, or Firm—Robert S. Salzman

[57] ABSTRACT

A method and apparatus is featured for encoding electronic intelligence into the horizontal synchronizing pulses of a television video signal, utilizing Amplitude Modulation of the horizontal synchronizing pulses during the active picture portion of the video field. The prime function of the invention is to utilize television transmission links as a co-existant transport medium for another form of electronic intelligence, typically, but not limited, to text, simultaneously with the transport of the television video signal. The invention clearly multiplies the efficiency and utility of existing and future television transmission links, by allowing another form of electronic intelligence to share transport mediums in a parasitic manner.

22 Claims, 6 Drawing Sheets

FIG. 1a
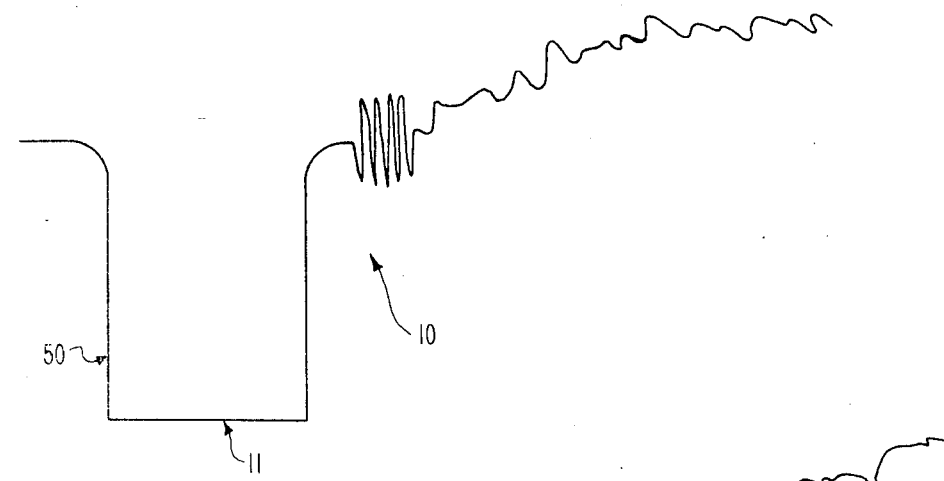
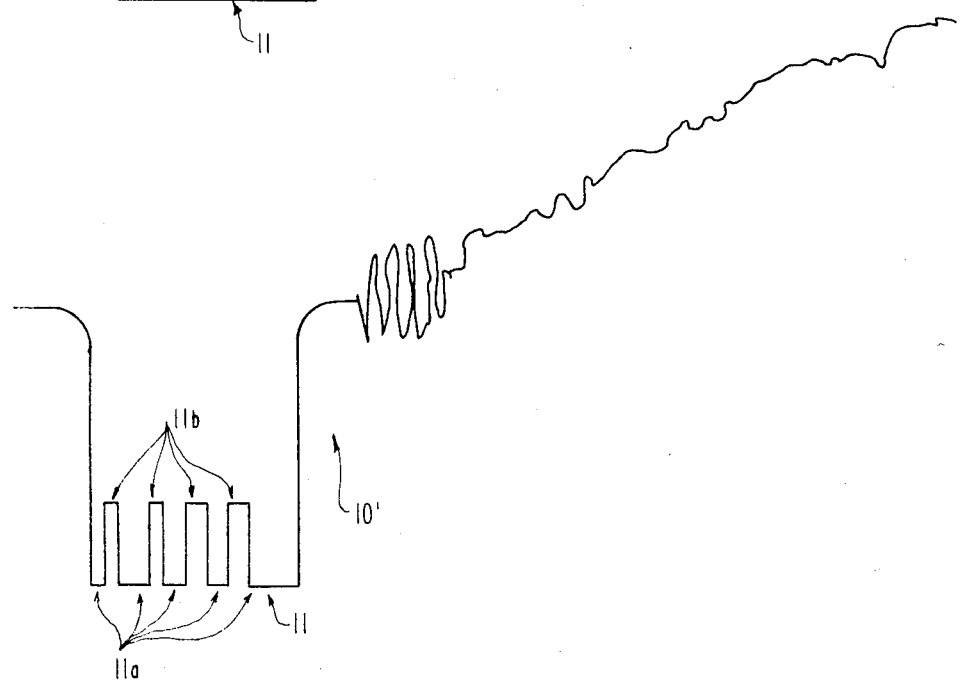
FIG. 1b

APPARATUS AND METHOD FOR TRANSMITTING INFORMATION BY MODULATED VIDEO SIGNAL

RELATED APPLICATION

This application is a continuation-in-part of previously filed U.S. patent application Ser. No. 760,874; filed: July 31, 1985: now abandoned. All prior teachings are meant to be incorporated herein by way of reference.

FIELD OF THE INVENTION

The invention comprises apparatus and method of multiplexing electronic intelligence, typically text, into a television video signal. The horizontal synchronizing pulses of the video signal are amplitude modulated during the active picture scan portion of the television field. This allows two differing forms of electronic intelligence to share a common transport medium simultaneously.

BACKGROUND OF THE INVENTION

The practice of time division multiplexing is not new, nor is the concept of multiplexing electronic intelligence other than video into a television video signal. For some years previous, television broadcasters have been multiplexing SMPTE Time Ccde, text and test signals into the video signal. What is novel to this invention is the method and location within the video signal for data insertion. Never before has the horizontal synchronizing pulse of the video signal contained any information other than horizontal synchronization. All prior intelligence inserted into the video signal has been within the Vertical Blanking period and never during the active picture scan. The Vertical Blanking method of intelligence insertion has roughly 254 microseconds available for data insertion. By contrast, the invention has approximately 1200 microseconds available, nearly an improvement of 5 times. The inventive method also possess the capability for handling 240 different sources of text simultaneously, due to the fact that each horizontal sync pulse possesses a distinct name or address within the video field duration.

DESCRIPTION OF RELATED ART

In the U.S. Pat. No. 4,205,343; issued: May 27, 1980; a method is described whereby additional intelligence is added to a television signal. The added information is added during the vertical blanking interval of the television signal, and not during the active scan portion, as is the method of the present invention. The additional information as transmitted according to U.S. Pat. No. 4,205,343 is transmitted directly to the television set of the home consumer without decoding.

In the present invention, the horizontal synchronizing pulses in the video field are amplitude modulated upon transmission, and then further demodulated before being sent to the set of the home consumer.

In U.S. Pat. No. 4,575,754; issued: Mar. 11, 1986, a video scrambler system is described. The video picture is disabled to prevent normal picture viewing without a restoring circuit within the consumer television set. No additional intelligence is added to the television signal as in the currently described invention.

In U.S. Pat. No. 4,352,047; issued: Sept. 28, 1982; a circuit is illustrated which corrects for distortion in a displayed television picture. The circuit described therein does not relate to carrying additional information within a television signal.

BRIEF SUMMARY OF THE INVENTION

The invention features a method and circuitry for adding information to a television signal during the active scan portion. The method encodes the information upon the video signal by amplitude modulating horizontal synchronizing pulses in the video field. The modulated video signal is transmitted to a receiving location where the information is decoded by demodulating the video signal, which is then sent to a home consumer or subscriber.

A relay station, such as an orbiting satellite may be utilized in the transmission.

The circuit for encoding the information comprises a sync separator for separating vertical and horizontal synchronizing pulses of the video signal. A control means, such as a microprocessor, receives a composite of the horizontal and vertical pulses, and also the vertical pulses from the sync separator. The vertical pulses allow the microprocessor to transfer data bits of information to a shift register, which stores them and then passes them to a selective means, such as a switching current source. The selective means passes only binary data bits to the horizontal signals in the field, in order to amplitude modulate them.

The encoding circuit allows the transmitted video signal to be the carrier of infommation, which is decoded by a demodulating circuit at a receiver location. The encoding and decoding circuits act in combination to transmit and extract the text from the video picture, before it is sent to local home sets.

The decoding circuit comprises a means for fixing the amplitude level of the received horizontal pulse signals in the video field. The sync separating means, which can comprise a pair of comparator amplifiers, separate the modulated from the unmodulated portions of the horizontal pulse signals. A control means or microprocessor receives the vertical synchronizing pulses which allows for the initiation of data bit transfer within the active scan portion of the video field.

A shift register receives the data bits corresponding to the modulated amplitude level of the horizontal synchronizing pulses.

When the shift register is full of data bits for each horizontal synchronizing pulse in the field, the microprocessor will provide storage for the data bits in response to the vertical synchronizing pulse in the video field.

The video signal of the invention can be transmitted by microwave, radio wave, laser beam, light modulated signal or via cable.

The inventive method of adding additional intelligence to the television signal requires no change in bandwidth, so that the additional intelligence may parasitically enjoy one way transport in a portion of the television spectrum space that is currently and previously unused. The encoder and decoder are provided at the respective ends of the television link. Intelligence is added during the ACTIVE PICTURE portion of the television signal and NOT during the VERTICAL BLANKING portion. The added intelligence is removed prior to distribution by government regulated air waves, but may remain intact in mediums such as satellite and cable services. An unused portion of the spectrum is used to parasitically transmit for example, 8 bits of data per television scan line, utilizing 240 scan lines per field in the NTSC system. Thus, enabling a data throughput rate for one television channel of 115,200 bits per second. If one character is taken to be 8 bits and one page of characters is taken to be 5000 characters, then the television channel would have the capability to send 864,000 bytes or 172.8 pages of text per minute. Huge amounts of data transmission can be projected on an hourly basis. A channel operating for 12 hours per day can transmit 10,368 pages per hour or 124,416 pages per 12 hour day. A channel operating for 24 hours per day would double this figure to 248,832 pages of text per day. The data may be multiplexed such that each television scan line would represent a separate destination, thus enabling 240 separate destinations per field or bulk transmission whereby all data is sent consecutively to a central receiving station and disseminated via coded headers.

It is an object of the invention to provide an improved method and circuitry for encoding and decoding information upon a television signal.

It is another object of this invention to provide for the encoding of an active scan portion of the video field utilizing amplitude modulating of horizontal synchronizing pulses.

It is a further object of the invention to provide for two differing forms of electronic intelligence to share a common transport medium simultaneously.

These and other objects of this invention will be better understood and will become more apparent with reference to the subsequent detaled description considered in conjunction with the accompanying drawings.

BRIEF DESCRIPTION OF THE DRAWINGS

FIG. 1a is a schematic diagram of one line of a typical horizontal synchronizing pulse in a video field.

FIG. 1b is a schematic diagram of the pulse of FIG. 1a after amplitude modulation.

DETAILED DESCRIPTION OF THE INVENTION

Figure 2:
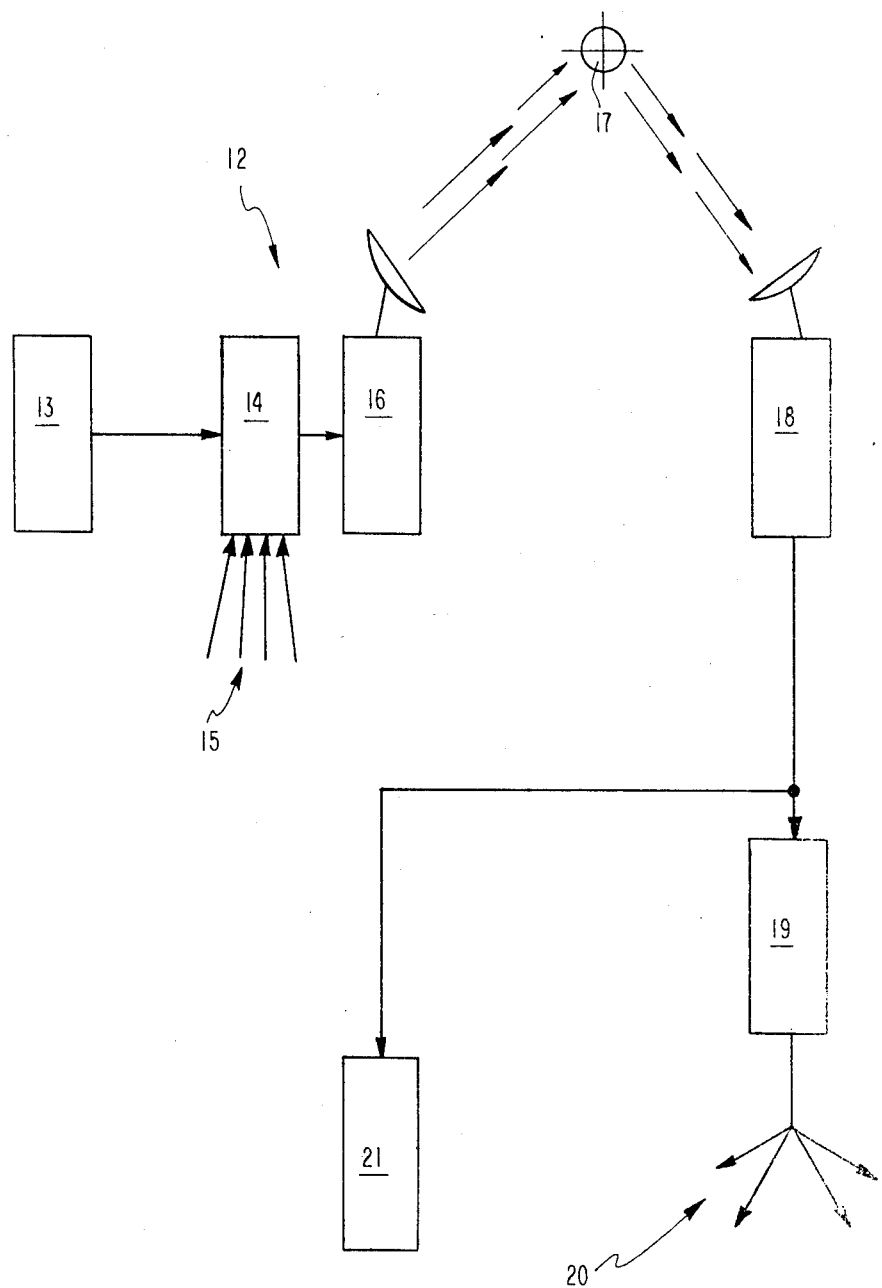
FIG. 2 is a block diagram of one proposed transmission and receiving network utilizing amplitude modulated horizontal synchronizing pulses, as shown in FIG. 1b.

Generally speaking, the invention features a method and circuit apparatus for the encoding of electronic intelligence, typically but not limited to text, into the horizontal synchronizing pulses of a television video signal, during the active picture portion of the television scan or field. The method of encoding is an Amplitude Modulation of the horizontal synchronizing pulses, typically but not limited to eight data bits per synchronizing pulse. Once encoding is accomplished, both Video and Data intelligence enjoy simultaneous transport to the receiver or receivers of said signal, without any changes necessary in transport device bandwidth characteristics. The horizontal synchronizing time domain of the video signals are largely unused and wasted.

At present, 240 of the available active picture scan lines are usable for horizontal sync pulse Amplitude Modulation by the inventive system. Each line has an individual and unique address. This format enables either one source of text to be transmitted 240 times per television field, or conversely, 240 differing sources of text to be transmitted once per television field.

Now referring to the figures, like components shall bear the same or similar designations throughout the drawings.

Referring to FIG. 1a, one line of a horizontal synchronizing pulse 10 in active video field or picture scan, is illustrated. The scan, or sync line 11 of pulse 10 is shown in a typical unmodulated state.

Referring to FIG. 1b, the pulse 10' is similar to the pulse 10 of FIG. 1a, but its sync line 11 has been amplitude modulated. The modulation is binary in nature, since sync line 11 now has two distinct amplitude levels 11a and 11b, respectively. In a preferred embodiment, the horizontal sync pulse 10' has been divided into eight separate segments or time slots. Encoding 240 of the available scan lines within one field, results in a data throughout rate of 115,200 Baud. At this rate of data transfer, twenty-three typical pages of text of approximatly 5,000 characters can be sent from transmitter to receiver in one second. Similarly, 1382 pages of text can be transported in one minute. The above relates to a situation whereby all 240 sync pulses within one field would be sending text from the same source. The inventive system 1a also capable of sending and receiving data from 240 different sources, at a much reduced baud rate.

Referring to FIG. 2, a network 12 for transmitting and receiving the modulated pulses of FIG. 1b, is depicted. The network 12 comprises a television studio 13 or other source of television signal origination. The television signal from station 12 is processed by an encoding circuit 14, which will be described in more detail hereinafter with reference to FIGS. 3 and 5. The encoder 14 is fed with data bits representing textual information through input lines 15, which number 1 through 240 for each available horizontal pulse in the video field.

The encoded television signals are then fed to a microwave transmission facility 16, that tranmits the encoded television signal to a relay satellite 17. The satellite 17 relays the signals to a microwave receiver or receivers 18, which can be at a distance representing an inter-continental transmission.

The received signals are then decoded by a decoding circuit 19, which will be described in more detail hereinafter, with respect to FIGS. 4 and 6. The decoding circuit 19 extracts the information for transmission to land lines 20. The decoded television signal is rebroadcast via transmission facility 21 to local area consumers or subscribers.

Figure 3:
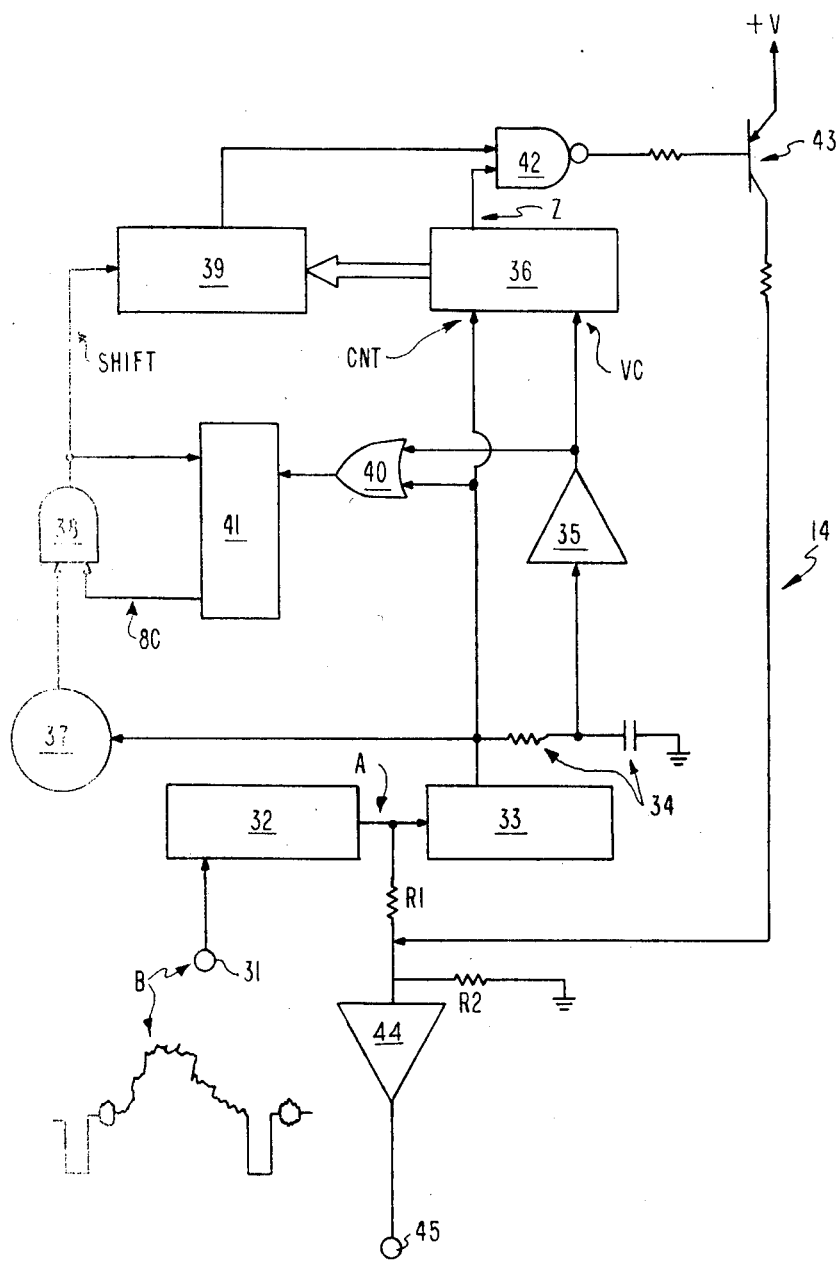
FIG. 3 is a block diagram of an encoding circuit for amplitude modulation of each horizontal synchronizing pulse in the video field.

Referring to FIG. 3, the encoding circuit 14 for modulating the television signal in accordance with FIG. 1b, is illustrated.

The unmodulated television signal, represented by "B" is fed to input 31 of D.C. restorer 32. The restored signal "A" is fed to a voltage divider consisting of resistors $R_1$ and $R_2$, and to a sync pulse separator 33. The output from the sync pulse separator 33 is composite sync containing both horizontal and vertical synchronizing pulses.

Integrating network 34 passes the Vertical sync pulses to amplifier 35, which are then amplified and appear at input point "VC" of a microprocessor 36. The composite sync pulses are fed to microprocessor 36 at input point "CNT", and also to phase locked loop 37. The logic gate 38 either passes shift pulses to shift register 39, or inhibits the passage of shift pulses to shift register 39.

The encoding will start with the first occurrence of Vertical sync at microprocessor input "VC". An OR gate 40 will reset shift pulse counter 41, to a count of zero. The microprocessor 36 will sense the occurrence of Vertical sync at its "VC" input and will then count six (6) equalizing pulses and ten (10) Vertical blanking Horizontal sync pulses, and is programmed to initiate action on count sixteen (16). The next horizontal sync pulse to occur will actually be count seventeen (17), but at this time microprocessor 36 will reset its count to zero, so that the next horizontal sync pulse that occurs will have an address of Line 1. The microprocessor 36 now fetches appropriate data for Line 1 and stores it in shift register 39. The microprocessor 36 will then feed enable signal "Z" to inverter gate 42 which up to now has been inhibited from passing data even though shift pulses have been passing to shift register 39 due to equalizing pulses and Vertical blanking sync pulses.

Shift pulses are currently not passing through logic gate 38, due to signal "8C" being asserted by shift pulse counter 41, reaching an eight (8) count and self inhibiting its own count input. At the next occurrence of the leading edge 50 (see FIG. 1a) of horizontal sync, shift pulses from loop 37 pass through gate 38 by virtue of OR gate 40 sending reset to counter 41, opening logic gate 38 to the passage of shift pulses. The output of shift register 39, passes through inverter gate 42, one bit at a time to the base of transistor switch 43. Whenever a data bit from shift register 39 is a high level, switch 43 will conduct a current into the junction of R1 and R2, producing the amplitude level 11b shown for pulse 10' of FIG. 1b. Whenever a data bit from shift register 39 is a low level, switch 43 will be inhibited from conduction, thus producing the amplitude level 11a for pulse 10'. The modulated horizontal synchronizing pulse 10 shown in FIG. 1b will appear at the output 45 of amplifier 44. This process continues for the duration of the horizontal sync pulse for line 1, until shift pulse counter 41 has counted 8 shift pulses. At this time, signal "8C" is asserted and gate 38 is inhibited from passing shift pulses. The microprocessor 36 meanwhile has been in a delay loop waiting for an amount of time slightly longer than the duration of horizontal sync. After this waiting period, the microprocessor 36 fetches data for the next sync pulse line 2, and deposits this data in shift register 39. The microprocessor 36 now has fifty (50) odd microseconds to wait for the occurrence of sync pulse 2, and does so by continuously sampling its "CNT" input. From now until line 240, signal "Z" is left in the enabled state as there will be no further equalizing or Vertical blanking sync pulses within this remaining field. At the next occurrence of horizontal sync, which will be line 2, OR gate 40 will reset shift pulse counter 41, and the process will repeat itself until the microprocessor 36 has counted two-hundred and forty (240) sync pulses, at which time signal "Z" will be asserted to inhibit further passage of data through gate 42. With no data input to switch 43, the video input "B" will pass through D.C. restorer 32 and the output amplifier 44 unmodulated and exactly as shown at input 31.

Figure 4:
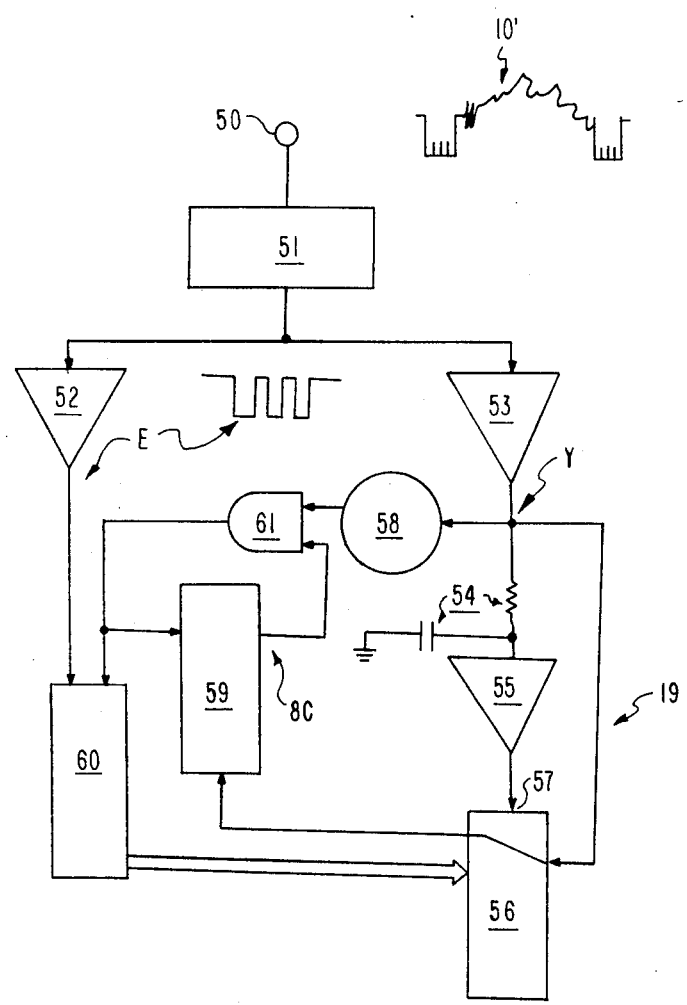
FIG. 4 is a block diagram of a decoding cicuit for demodulating the received modulated pulse of FIG. 1b.

Referring to FIG. 4, decoding circuit 19 is shown. Pulse 10' is the video signal containing Amplitude Modulated horizontal synchronizing pulses which is fed to input 50. Pulse 10' is fed to a D.C. restorer 51 in order to fix amplitude level 11a (see FIG. 1b) at a constant and known D.C. voltage level. The output of restorer 51 connects to comparator amplifiers 52 and 53, respectively. Amplifier 52 is biased to amplify only the modulated data portion of the sync pulse, while amplifier 53 is biased to amplify the unmodulated portion of the sync pulse above the data level. The output of amplifier 53 is composite sync containing both horizontal and vertical sync pulses. Integrating network 54 allows Vertical sync to pass to amplifier 55, which produces amplified Vertical sync which is fed to microprocessor 56 at input 57. Composite sync outputs at "Y" from amplifier 53 are fed to a phase locked loop 58, the microprocessor 56 and a shift pulse counter 59. At the start of the decoding cycle, Vertical sync has just occurred and microprocessor 56 is counting equalizing and Vertical blanking sync pulses. When a count of sixteen (16) is reached, microprocessor 56 will reset its counter so that the next count will be a count of one (1).

Amplified data from amplifier 52 is shown at "E", which feeds to the data input of shift register 60. On the occurrence of the next horizontal sync pulse, line 1, the microprocessor 56 senses line 1. Also horizontal sync output at "Y", resets shift pulse counter 59 and Modulated data shown at "E" are shifted into shift register 60, one data bit at a time, by gate 61. After shift pulse counter 59 has counted 8 shift pulses, signal "8c" is asserted, inhibiting shift pulses from passing through gate 61. Meanwhile the microprocessor 56 has been in a delay loop to wait a period of time that is slightly longer than the duration of horizontal sync, for the purpose of allowing shift register 60 to be fully loaded with 8 data bits. After waiting this time, microprocessor 56 reads the data contained in shift register 60 and stores it in a buffer (not shown) for line 1. The system remains static until the next occurrence of horizontal sync output "Y", which will be line 2. The process repeats itself until microprocessor 56 reaches a count of line two hundred forty (240), at which time the microprocessor 56 will cease to read data from shift register 60 and inseead will search for the occurrence of Vertical sync at input 57. When Vertical sync is again sensed by the microprocessor 56 the process will repeat itself from line 1 through 240, once again.

Figure 5:
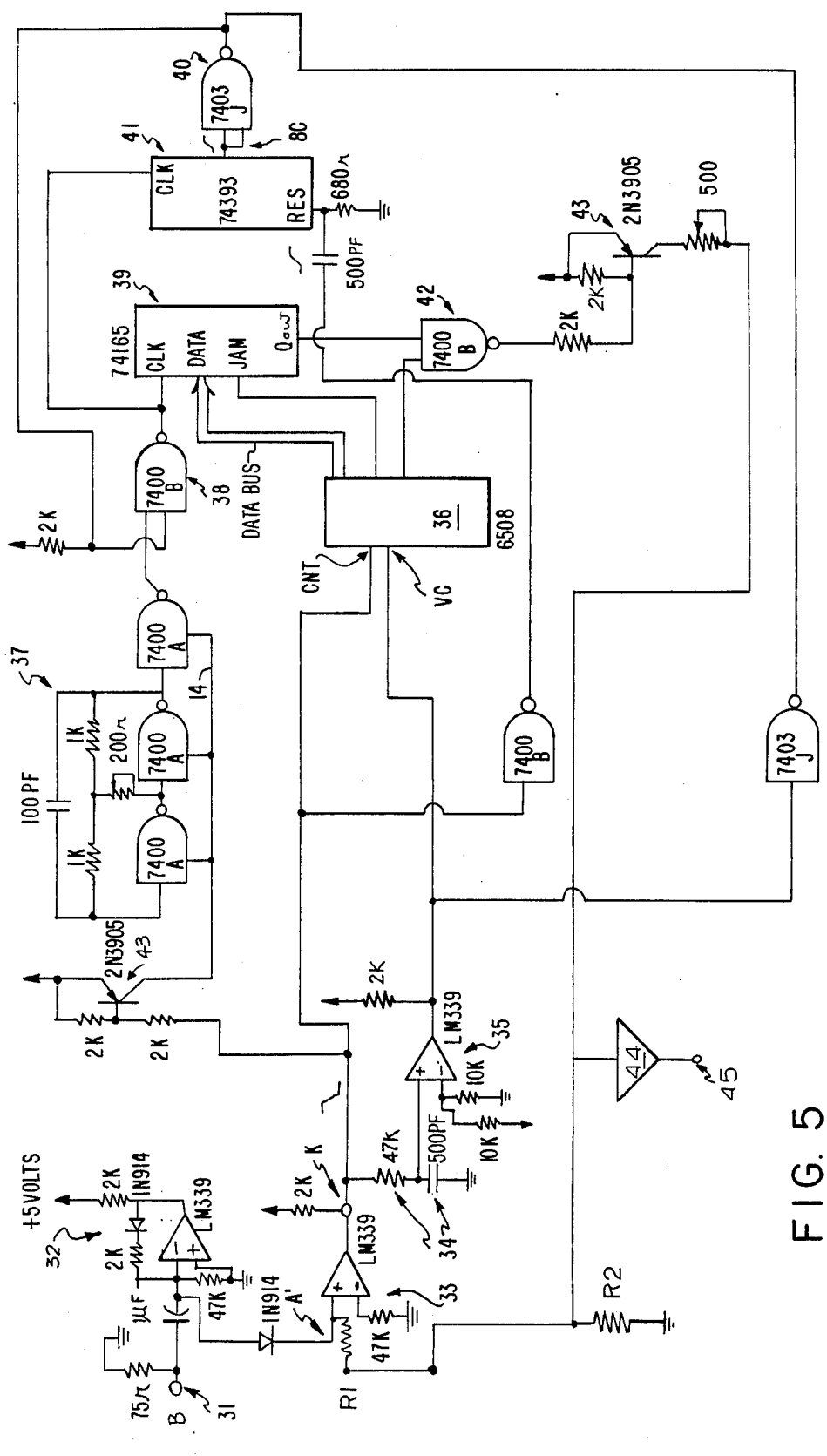
FIG. 5 is a detailed circuit diagram for the encoding circuit shown in FIG. 3.

Now referring to FIG. 5, the encoding circuit 14 of FIG. 3 is shown in more detail.

The signal "B" enters the input 31 of restorer 32. The restorer 32 clamps the tip of the sync signal to a few tenths of a volt above zero volts D.C.

The comparator 33 is configured to extract the composite sync signal "B" from the restorer 32 at point A'. The composite sync signal appears at point "K".

The comparator 35 combines with the integration network 34 to separate the vertical sync signal from the composite sync signal, which originates at point "K", and flows into comparator 35 through network 34.

The vertical sync signal is fed to input "VC" of microprocessor 36. The microprocessor 36 now has the capability of synchronizing its actions with the occurrence of the vertical sync signal.

The microprocessor 36 also receives the composite sync signal at input "CNT", so that the microprocessor 36 can control the flow of data bits in accordance with horizontal synchronizing pulses.

The phase locked oscillator 37 is gated into square wave oscillation by virtue of the transistor current source 43, which is activated during the horizontal sync portion of the signal at point "K". The oscillator 37 produces (typically) eight (8) shift pulses per horizontal sync pulse. The output of oscillator 37 is fed to gate 38.

The shift pulse output of gate 38 is fed to counter 41, which counts the desired number of pulses fed to shift register 39.

At the occurrence of the eighth shift pulse, the passage of further shift pulses through gate 38 is inhibited by virtue of OR gate 40.

The counter 41 is reset to a count of zero whenever the beginning of the transition of horizontal sync occurs by virtue of inverter at point "K" and differentiating network connected to its reset terminal.

The data input to shift register 39 is loaded therein by microprocessor 36 asserting the "JAM" signal of shift register 39.

Thus, parallel loading of 8 data bits into the shift register 39 occurs prior to horizontal sync.

Upon the occurrence of horizontal sync, the gate 38 enables the eight shift pulses to be shifted serially out of shift register 39. The eight data bits flow to gate 42, which is controlled by microprocessor 36. The data flow through shift register 39 to transistor 43 is enabled by microprocessor 36. Gate 42 is the means by which the microprocessor 36 inhibits data passage during the vertical blanking period.

Transistor 43 operates as a switching current source which depends upon the input from gate 42. The transistor 43 will add current pulses to the horizontal sync pulse to denote a logic "1" bit, or pass no current to denote a logic "0" bit.

The current pulses are added at output 45. The addition, or lack thereof, of pulses to the horizontal sync signals equates to adding textual information which is identifiable through byte recognition.

The vertical sync signal fed to microprocessor 36 is a time recognition of when to initiate the sequence for encoding one field of video, or typically 240 scan lines. The microprocessor 36 needs only to count a given number of horizontal sync pulses in order to initiate another field of data encoding, since it is capable of discerning the occurrence of vertical sync.

Figure 6:
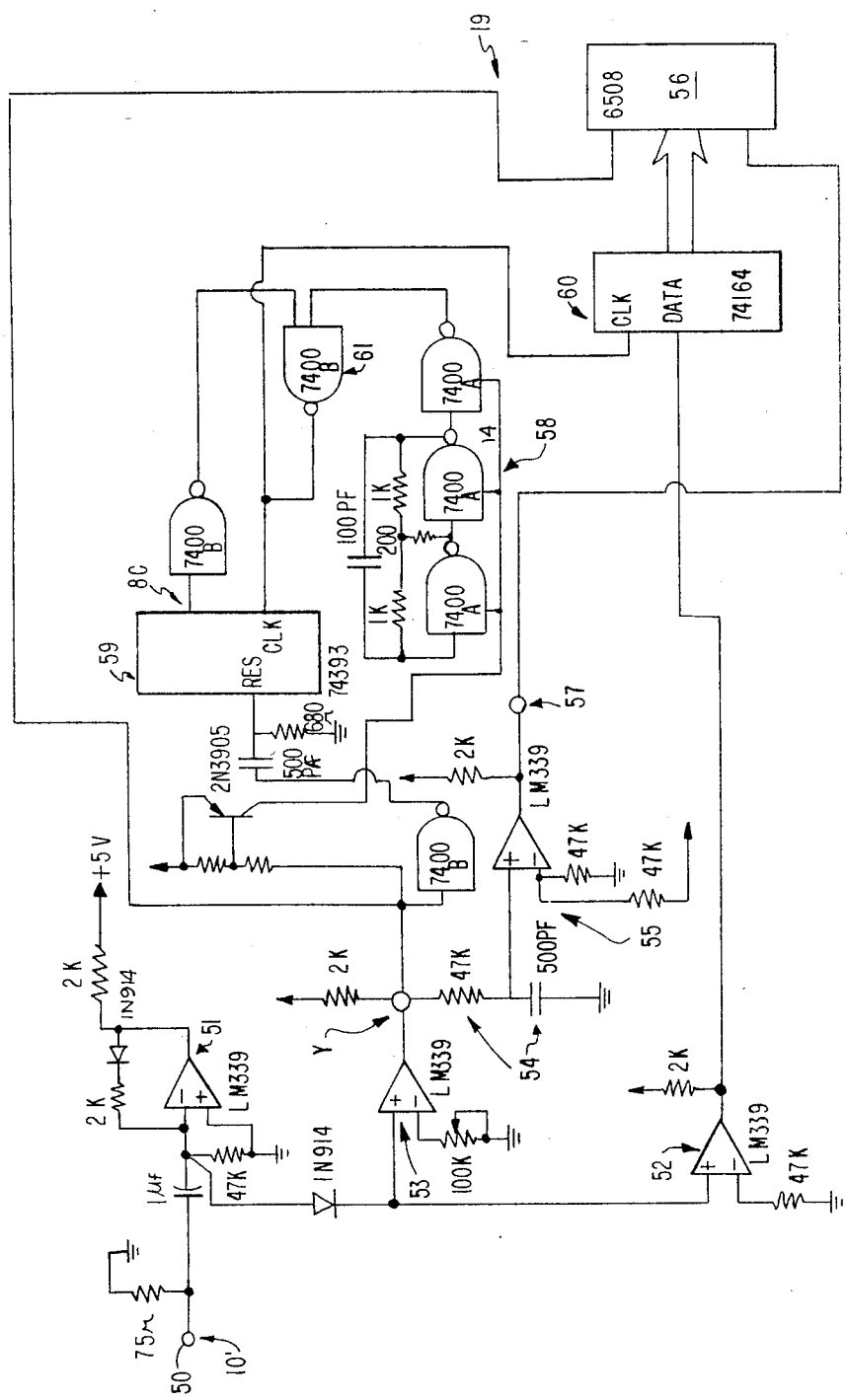
FIG. 6 is a detailed circuit diagram for the decoding circuit shown in FIG. 4.

Referring now to FIG. 6, the decoding circuit 19 of FIG. 4 is depicted in more detail.

The modulated signal 10' is fed to input 50. The composite signal enters comparator 51 configured as a D.C. restorer, that clamps the tip of the sync pulse to a few tenths of a volt above zero.

The comparator 53 extracts the composite sync signal from the restored input. Composite sync appears at point "Y".

Comparator 55 extracts the vertical sync signal from the composite sync signal at point "Y" by virtue of comparator 55 and integration network 54. Vertical sync appears at point 57 and is fed to microprocessor 56.

Comparator 52 amplifies the composite sync and data bits contained therein and feeds them to the serial data input of shift register 60.

The phase locked oscillator 58 feeds typically eight (8) shift pulses during ita "gated on" period, which is controlled by a transistor current switch 65 driven from composite sync at point "Y".

The oscillator 58 is adjusted, such that its shift pulse output is delayed a small amount (typically 100 nanoseconds) of time from the imbedded data present in the horizontal sync pulses.

The gate 61 either enables or inhibits the passage of shift pulses to shift register 60 by virtue of counter 59, which counts the number of shift pulses allowed during the horizontal sync period (typically eight (8)).

The counter 59 is reset to a count of zero at the beginning transition of each horizontal sync pulse.

The microprocessor 56 is also fed the composite sync signal at point "Y", and therefore knows whenever horizontal sync occurs.

The microprocessor 56 knows that in a few microseconds hence, eight (8) bits of data are shifted into the shift register 60.

At this point in time microprocessor 56 will latch the eight (8) bits of data into its data bus in parallel, and will either store the data in memory or pass it on to another device for further processing.

Vertical sync which is fed to the microprocessor 56 from point 57 allows the microprocessor 56 to know when the passage of vertical blanking has occurred, and to expect sync imbedded data in the scan lines that follow.

Having thus described the invention, what is desired to be protected by Letters Patent is presented in the subsequently appended claims.

What is claimed is:

1. A circuit for encoding information upon horizontal synchronizing pulses in an active scan portion of a video field, comprising:
   sync separating means for separating vertical and horizontal synchronizing pulses of a video signal;
   a control means connected to said sync separating means for receiving said vertical synchronizing pulses, said vertical synchronizing pulses causing said control means to initiate data bit transfer within an active scan portion of a video field, and said control means receiving a composite of said vertical and horizontal synchronizing pulses;
   a shift register connected to said control means and said sync separating means, said shift register receiving information in the form of data bits from said control means for storing said data bits; and
   selective means connected to said shift register and said control means for receiving said data bits from said shift register and selectively passing said data bits to each horizontal pulse signal in said video field for amplitude modulating said horizontal pulse signals in response to an enabling control means signal, said control means controlling the storing and passing of data bits from said shift register to each horizontal pulse signal in said video field via said selective means, in response to a vertical synchronizing pulse in said video field.

2. The encoding circuit of claim 1, wherein said selective means passes only binary data bits for modulating said horizontal pulse signals.

3. The encoding circuit of claim 2, wherein said selective means comprises a switching current source.

4. The encoding circuit of claim 1, wherein said control means comprises a microprocessor.

5. The encoding circuit of claim 1, disposes at a video signal transmitting location, said encoding circuit in combination with a decoding crcuit disposed at a video signal receiving location, said decoding circuit obtaining said information from the video signal by demodulating said horizontal pulse signals.

6. The combination of encoding and decoding circuits of claim 5, wherein said decoding circuit comprises:

means for fixing the amplitude level of received horizontal pulse signals in said video field;

sync separating means connected to said fixing means for separating modulated from unmodulated portions of the horizontal pulse signals;

a control means connected to said sync separating means for receiving said vertical synchronizing pulses, said vertical synchronizing pulses causing said control means to initiate data bit transfer within an active scan portion of said video field, and said control means receiving a composite of said vertical and horizontal synchronizing pulses; and a shift register connected to said control means and said sync separating means, for receiving data bits corresponding to a modulated amplitude 1 of said horizontal synchronizing pulses, said control means controling the introduction of data bits into said shift register, and upon said shift register being full of data bits, said control means providing for the storage of said data bits corresponding to each horizontal synchronizing pulse in said video field, in response to said vertical synchronizing pulse in said video field.

7. The combination of encoding and decoding circuits of claim 6, wherein the sync separating means of said decoding circuit comprises a pair of comparator amplifiers.

8. The combination of encoding and decoding circuits of claim 6, wherein said control means comprises a microprocessor.

9. The combination of encoding and decoding circuits of claim 6, further comprising a relay station between the video signal transmitting location and the video signal receiving location.

10. The combination of encoding and decoding circuits of claim 9, wherein said relay station comprises a relay satellite.

11. A binary method of encoding a television signal for the purpose of transmitting two differing forms of electronic information simultaneously between at least two locations, comprising the step of encoding information upon a video signal by amplitude modulating horizontal synchronizing pulses of said video signal without alteration or degradation of said video signal during an active scan portion of a video field.

12. A binary method of transmitting and receiving two differing forms of electronic information simultaneously, wherein textual information is contained within a television video signal, comprising the steps of:

(a) encoding information upon a video signal by amplitude modulating horizontal synchronizing pulses of said video signal without alteration or degradation of said video signal during an active scan portion of a video field at a television transmitting location;

(b) transmitting said modulated video signal from said television signal transmitting location;

(c) receiving said modulated video signal at a television signal receiving location; and (d) obtaining said information from the received video signal by demodulating said video signal.

13. The method of claim 12, wherein in step (b) the modulated signal is transmitted to a relay station, and further wherein said relay station relays said modulated signal to said television signal receiving station.

14. The method of claim 13, wherein said relay station comprises at least one relay satellite.

15. The method of claim 12, further comprising the step of:

(e) sending said demodulated signal to at least one consumer or subscriber location.

16. The method of claim 12, wherein said video signal is transmitted by microwave.

17. The method of claim 12, wherein said video signal is transmitted by laser beam.

18. The method of claim 12, wherein said video signal is transmitted by radio wave.

19. The method of claim 12, wherein said video signal is transmitted via cable.

20. The method of claim 12, wherein said video signal comprises a light modulated signal.

21. A binary television network for transmitting and receiving additional electronic information simultaneously with said video signal, said information disposed within an active scan portion of a modulated video signal, comprising:

a binary encoding circuit disposed at a transmitting location for encoding information upon a video signal by amplitude modulating horizontal synchronizing pulses of said video signal without alteration or degradation of said video signal during an active scan portion of a video field; and a binary decoding circuit disposed at a receiving location for decoding said information by demodulating said horizontal synchronizing pulses.

22. The television network of claim 21, further comprising a relay means located between said transmitting and receiving locations, for relaying transmitted video signals to said receiving location.

* * * * *